Patented Aug. 26, 1947

2,426,375

UNITED STATES PATENT OFFICE 2,426,375

AMINES AND PROCESS FOR PREPARING THEM

Murray Senkus, Terre Haute, Ind., assignor to Commercial Solvents Corporation, Terre Haute, Ind., a corporation of Maryland No Drawing. Application February 21, 1945, Serial No. 579,162

8 Claims. (Cl. 260—293)

My invention relates to new and useful amines. More particularly, it is concerned with amines of the following structural formula

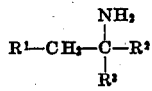

wherein $R^1$ may be either piperidine, a substituted or unsubstituted pyrrolidine or a morpholine ring, and $R^2$ and $R^3$ represent alkyl groups.

This case is a continuation-in-part of my co-pending Serial No. 455,932, filed August 24, 1942.

Amines of the above type are readily prepared from the corresponding nitro compounds by subjecting the latter to catalytic liquid phase high pressure hydrogenation. In accordance with this procedure, the nitro compounds, catalyst and a suitable solvent, such as methyl or ethyl alcohol, are introduced into a pressure hydrogenation apparatus of conventional design, such as that described at pages 29 to 45 in Adkins' treatise on "Reactions of Hydrogen" (University of Wisconsin Press, 1937), which comprises a cylindrical steel reaction vessel fitted with a flexible tubing for the introduction of hydrogen under pressure. The apparatus may be equipped with a suitable agitation means, and an electrical heating unit in order that the reduction may be effected under as widely varying conditions as are deemed necessary or desirable.

The catalyst utilized may be any of several hydrogenation catalysts which are active under the operation temperatures employed. A number of such hydrogenation catalysts are described in Ellis' book on "Hydrogenation of Organic Substances," 3rd ed. (1930). In the majority of instances, however, I have found that the well-known Raney nickel catalyst usually gives the most satisfactory results. Numerous other hydrogenation catalysts are, nevertheless, quite satisfactory and will be found to be sufficiently active under the operating conditions employed to result in adequate yields of amines, which render the use of such catalaysts practicable from an economical standpoint. For example, nickel precipitated from nickel carbonate, and supported on infusorial earth (Covert et al, J. Amer. Chem. Soc. 54, 1651 (1932)), or catalysts of nickel on silica gel (Holmes and Anderson, Ind. & Eng. Chem. 17, 280 (1925)), may also be employed. These catalysts are most active at temperatures above 80–85° C., however, and are less desirable for hydrogenation reactions occurring at lower temperatures. In general, it will be found preferable to utilize catalysts that are active at lower temperatures, due to the tendency of the nitro compounds to decompose under conditions of elevated temperature and pressure.

Hydrogen is introduced into the apparatus in a manner such that the pressure exerted thereby will vary from approximately 300 to over 2000 pounds per square inch. In general, however, I prefer to use pressures ranging from between about 500 to 1000 pounds per square inch, but it is to be understood that other hydrogen pressures may be employed, their values generally being determined by the temperature used. The hydrogenation is preferably carried out at temperatures ranging from between about 30° and 50° C., with constant agitation for a period of from one to four hours. Temperatures of from 100° to 125° C., may nevertheless be utilized provided adequate precautions are taken with respect to the hydrogen pressure used. Ordinarily, optimum conditions in regard to time of reaction, temperature, pressure, and catalyst in any given instance, may readily be determined by simple experiment.

When the reduction is complete, the reaction mixture is removed from the apparatus, and the catalyst separated by filtration or other suitable means. The resulting filtrate is then distilled at atmospheric pressure to remove the solvents, after which a liquid, such as benzene or toluene, is added to the still residue for the purpose of removing the water formed during the reduction of the nitro compound. After all of the water is removed in this manner, the crude amine, if a liquid, is purified by rectification at atmospheric pressure or under vacuum, or by recrystallization from a suitable solvent, if it happens to be a solid under ordinary conditions.

The nitro compounds employed as starting materials for the preparation of the amines of my invention, may be synthesized in accordance with the procedure described in my co-pending application, U. S. Serial No. 455,931, filed August 24, 1942. By this procedure, a primary or secondary aliphatic amine is reacted with formaldehyde to form the corresponding N-hydroxymethyl, mono-, or dialkylamine, which is in turn reacted with an equimolecular quantity of a secondary nitroparaffin to produce the desired nitro compounds. The preparation of such nitro compounds is preferably carried out at temperatures of from between about 25°–30° C. Temperatures above this range may be used, but in doing so, care should be exercised to avoid temperatures which cause the formaldehyde to be volatilized from the reaction mixture.

Although it may generally be desirable to reduce the substantially pure nitro compounds, I have observed that highly satisfactory and frequently equally as good results are obtained by subjecting the entire reaction mixture, containing the crude nitro compound, to reduction in the presence of a suitable catalyst, and solvent as described above.

My invention may be further illustrated by the following specific examples:

Example I

One hundred parts of N-(2-nitroisobutyl)piperidine were mixed with one hundred parts of methyl alcohol and 5 parts of Raney nickel catalyst after which the resulting mixture was introduced into a suitable hydrogenation apparatus and sealed. Hydrogen was then added at a pressure of 500 pounds per square inch and at a temperature of 30°–50° C. After absorption of hydrogen had substantially ceased, the solution was removed from the apparatus, filtered, and the filtrate distilled at atmospheric pressure to remove the methyl alcohol. Two hundred parts of benzene were then added to the still residue and the water produced by the reduction of the nitro compound to the corresponding amine was removed as a constant boiling mixture with benzene, the latter being returned to the still until substantially all of the water had been separated from the crude amine. The residue was then distilled under reduced pressure and the fraction boiling at 60.5° C. at 6 mm. pressure was collected. The quantity of N-(2-aminoisobutyl)piperidine recovered amounted to a conversion of about 95%. The product had a nitrogen content of 17.86% as compared to a calculated value of 17.94%.

Example II

One hundred parts of N-(2-nitroisobutyl)-2,5-dimethylpyrrolidine were mixed with one hundred parts of methyl alcohol and 5 parts of Raney nickel catalyst after which the resulting mixture was introduced into a suitable hydrogenation apparatus and sealed. Hydrogen was then added at a pressure of 500 pounds per square inch and at a temperature of 30°–50° C. After absorption of hydrogen had substantially ceased, the solution was removed from the apparatus, filtered, and the filtrate distilled at atmospheric pressure to remove the methyl alcohol. Two hundred parts of benzene were then added to the still residue and the water produced by the reduction of the nitro compound to the corresponding amine was removed as a constant boiling mixture with benzene, the latter being returned to the still until substantially all of the water had been separated from the crude amine. The residue was then distilled under reduced pressure and the fraction boiling at 59–60° C. at 3 mm. pressure was collected. The quantity of N-(2-aminoisobutyl)-2,5-dimethylpyrrolidine recovered amounted to a conversion of about 69%. The product had a nitrogen content of 16.42% as compared to a calculated value of 16.45%.

Example III

One hundred parts of crude N-(2-nitroisobutyl)-morpholine were mixed with one hundred parts of methyl alcohol and 5 parts of Raney nickel catalyst after which the resulting mixture was introduced into a suitable hydrogenation apparatus and sealed. Hydrogen was then added at a pressure of 500 pounds per square inch and at a temperature of 30°–50° C. After absorption of hydrogen had substantially ceased, the solution was removed from the apparatus, filtered, and the filtrate distilled at atmospheric pressure to remove the methyl alcohol. Two hundred parts of benzene were then added to the still residue and the water produced by the reduction of the nitro compound to the corresponding amine was removed as a constant boiling mixture with benzene, the latter being returned to the still until substantially all of the water had been separated from the crude amine. The residue was then distilled under reduced pressure and the fraction boiling at 68° C. at 6 mm. pressure was collected. The quantity of N-(2-aminoisobutyl)morpholine recovered amounted to a conversion of about 59%. The product had a nitrogen content of 17.69% as compared to a calculated value of 17.72%.

The amines of the above-mentioned type are generally either colorless liquids or white solids. These amines are, as a rule, insoluble in water, but are soluble in the lower aliphatic alcohols, ether, and benzene. The majority of these amines tend to decompose on distillation at atmospheric pressure.

The amines of my invention have been found to be useful in certain instances as intermediates for the preparation of surface active agents. They are likewise useful as intermediates in the preparation of numerous other valuable organic compounds and compositions. Additional uses of these products will readily occur to those skilled in the art.

My invention now having been described, what I claim is:

1. Amines of the formula

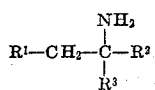

wherein $R^1$ is a member selected from the group consisting of piperidine, pyrrolidines, and morpholine, and $R^2$ and $R^3$ represent alkyl groups.

2. N-(2-aminoisobutyl)piperidine.

3. N-(2-aminoisobutyl)-2,5-dimethylpyrrolidine.

4. N-(2-aminoisobutyl)morpholine.

5. In a process for the preparation of amines of the formula

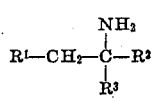

wherein $R^1$ is a member selected from the group consisting of piperidine, pyrrolidines, and morpholine, and $R^2$ and $R^3$ represent alkyl groups, the step which comprises subjecting the corresponding nitro compound to hydrogenation in the liquid phase in the presence of a nickel hydrogenation catalyst at a temperature not substantially in excess of 125° C.

6. In a process for the preparation of N-(2-aminoisobutyl)piperidine, the step which comprises subjecting N-(2-nitroisobutyl)piperidine to hydrogenation in the liquid phase in the presence of a nickel hydrogenation catalyst at a temperature not substantially in excess of 125° C.

7. In a process for the preparation of N-(2-aminoisobutyl)-2,5-dimethylpyrrolidine, the step which comprises subjecting N-(2-nitroisobutyl)-2,5-dimethylpyrrolidine to hydrogenation in the liquid phase in the presence of a nickel hydrogenation catalyst at a temperature not substantially in excess of 125° C.

8. In a process for the preparation of N-(2-aminoisobutyl) morpholine, the step which comprises subjecting N-(2-nitroisobutyl) morpholine to hydrogenation in the liquid phase in the presence of a nickel hydrogenation catalyst at a temperature not substantially in excess of 125° C.

MURRAY SENKUS.

REFERENCES CITED

The following references are of record in the file of this patent:

UNITED STATES PATENTS

| Number | Name | Date |
| --- | --- | --- |
| 2,157,391 | Vanderbilt | May 9, 1939 |
| 2,157,386 | Johnson | May 9, 1939 |

OTHER REFERENCES

Chem. Abstracts, 1938, page 494 citing: Bull. Soc. Chim. (5), pages 1451–1468.